(12) United States Patent
Kim et al.

(10) Patent No.: US 12,321,072 B2
(45) Date of Patent: Jun. 3, 2025

(54) OPTICAL DEVICE

(71) Applicant: LG Chem, Ltd., Seoul (KR)

(72) Inventors: Jung Woon Kim, Daejeon (KR); Dong Hyun Oh, Daejeon (KR); Jung Sun You, Daejeon (KR); Jin Hong Kim, Daejeon (KR); Min Jun Gim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/007,820

(22) PCT Filed: Jul. 2, 2021

(86) PCT No.: PCT/KR2021/008393
§ 371 (c)(1),
(2) Date: Dec. 2, 2022

(87) PCT Pub. No.: WO2022/010185
PCT Pub. Date: Jan. 13, 2022

(65) Prior Publication Data
US 2023/0229050 A1    Jul. 20, 2023

(30) Foreign Application Priority Data

Jul. 9, 2020 (KR) .................. 10-2020-0084734
Oct. 29, 2020 (KR) .................. 10-2020-0142095

(51) Int. Cl.
*G02F 1/137* (2006.01)
*G02F 1/1333* (2006.01)
(Continued)

(52) U.S. Cl.
CPC .... *G02F 1/13725* (2013.01); *G02F 1/133531* (2021.01); *G02F 1/1337* (2013.01);
(Continued)

(58) Field of Classification Search
None
See application file for complete search history.

(56) References Cited

U.S. PATENT DOCUMENTS

2007/0019150 A1    1/2007    Slikkerveer et al.
2007/0132937 A1    6/2007    Lee et al.
(Continued)

FOREIGN PATENT DOCUMENTS

CN    101424814 A    5/2009
CN    103838050 A    6/2014
(Continued)

OTHER PUBLICATIONS

Jang, Se-Jin, et al., "P-120: Tight Bonding of Two Plastic Substrates for Flexible LCDs", SID Symposium Digest of Technical Papers, vol. 38, Issue 1, Jul. 2012. pp. 653-656.
(Continued)

*Primary Examiner* — Phu Vu
(74) *Attorney, Agent, or Firm* — Lerner David LLP

(57) ABSTRACT

An optical device is disclosed herein. In some embodiments, an optical device includes a first outer substrate, a second outer substrate, a liquid crystal element film positioned between the first and second outer substrates, intermediate layers positioned between the first outer substrate and the liquid crystal element film and between the liquid crystal element film and the second outer substrate, respectively, wherein a sum of the total thicknesses of the intermediate layers is 1,600 μm or more. The optical device can secure structural stability and good quality uniformity by maintaining the cell gap of the liquid crystal element film properly, having excellent attachment force between the upper substrate and the lower substrate, and minimizing defects such as pressing or crowding in the bonding process of the outer substrates.

14 Claims, 10 Drawing Sheets

(51) Int. Cl.
  *G02F 1/1335* (2006.01)
  *G02F 1/1337* (2006.01)
  *G02F 1/1339* (2006.01)

(52) U.S. Cl.
  CPC .... *G02F 1/13394* (2013.01); *G02F 1/133302* (2021.01); *G02F 2202/28* (2013.01)

(56) References Cited

U.S. PATENT DOCUMENTS

| | | |
|---|---|---|
| 2009/0103029 A1 | 4/2009 | Miyazaki et al. |
| 2016/0048067 A1* | 2/2016 | Shim ............... H01L 29/66765 438/158 |
| 2016/0091743 A1 | 3/2016 | Yu et al. |
| 2017/0090237 A1 | 3/2017 | Kim et al. |
| 2017/0227811 A1 | 8/2017 | Oda |
| 2017/0242285 A1 | 8/2017 | Jiang et al. |
| 2018/0074377 A1 | 3/2018 | You et al. |
| 2018/0132370 A1 | 5/2018 | Choi et al. |
| 2020/0019008 A1 | 1/2020 | Jeon et al. |
| 2020/0057335 A1 | 2/2020 | Lee et al. |
| 2020/0285107 A1 | 9/2020 | Park et al. |
| 2020/0310185 A1 | 10/2020 | Kim et al. |
| 2021/0055463 A1* | 2/2021 | Lee .................... G02F 1/1339 |
| 2021/0223602 A1 | 7/2021 | Kim et al. |
| 2023/0384638 A1 | 11/2023 | Kim et al. |

FOREIGN PATENT DOCUMENTS

| | | |
|---|---|---|
| CN | 204390199 U | 6/2015 |
| CN | 106796366 A | 5/2017 |
| EP | 3617770 A1 | 3/2020 |
| EP | 4239400 A1 | 9/2023 |
| JP | H11242228 A | 9/1999 |
| JP | 2007504502 A | 3/2007 |
| JP | 2019144681 A * | 8/2019 |
| JP | 2020030355 A | 2/2020 |
| KR | 20010015429 A | 2/2001 |
| KR | 20070062739 A | 6/2007 |
| KR | 20140030245 A | 3/2014 |
| KR | 20160146566 A | 12/2016 |
| KR | 20170038579 A | 4/2017 |
| KR | 20170064744 A | 6/2017 |
| KR | 20180052810 A | 5/2018 |
| KR | 20180119519 A | 11/2018 |
| KR | 20190050577 A | 5/2019 |
| KR | 20190096890 A | 8/2019 |
| KR | 20190140743 A | 12/2019 |
| KR | 20200019350 A | 2/2020 |
| KR | 20200019563 A | 2/2020 |
| KR | 20200088118 A | 7/2020 |
| TW | 200839325 | 10/2008 |
| TW | 202009524 A | 3/2020 |
| WO | 2007100921 A2 | 9/2007 |
| WO | 2019107709 A1 | 6/2019 |
| WO | 2019107906 A1 | 6/2019 |

OTHER PUBLICATIONS

International Search Report for PCT/KR2021/008393 mailed Oct. 22, 2021. 3 pgs.
Extended European Search Report for Application No. 21838025.1 dated Dec. 5, 2023. 10 pgs.

* cited by examiner

[Figure 1]
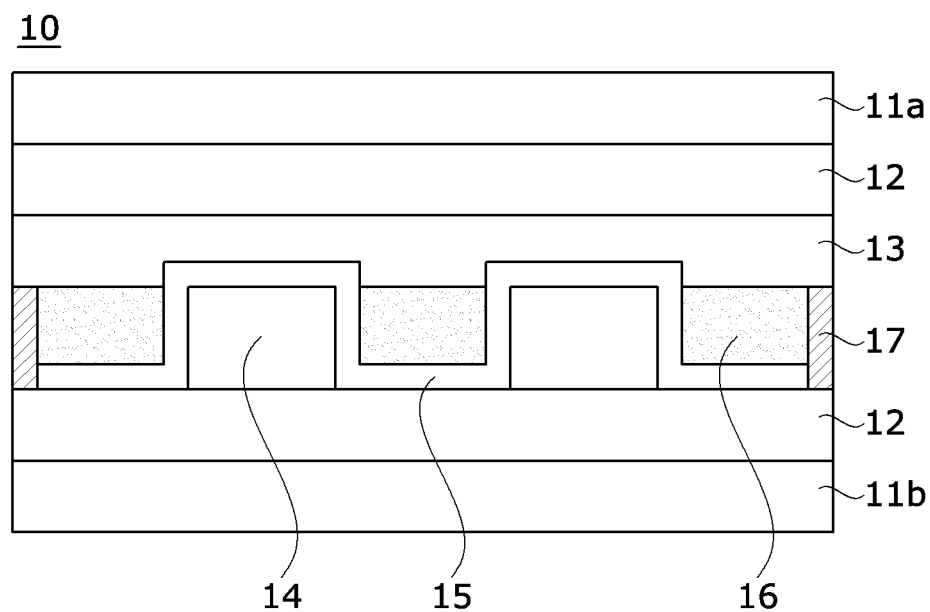

[Figure 2]
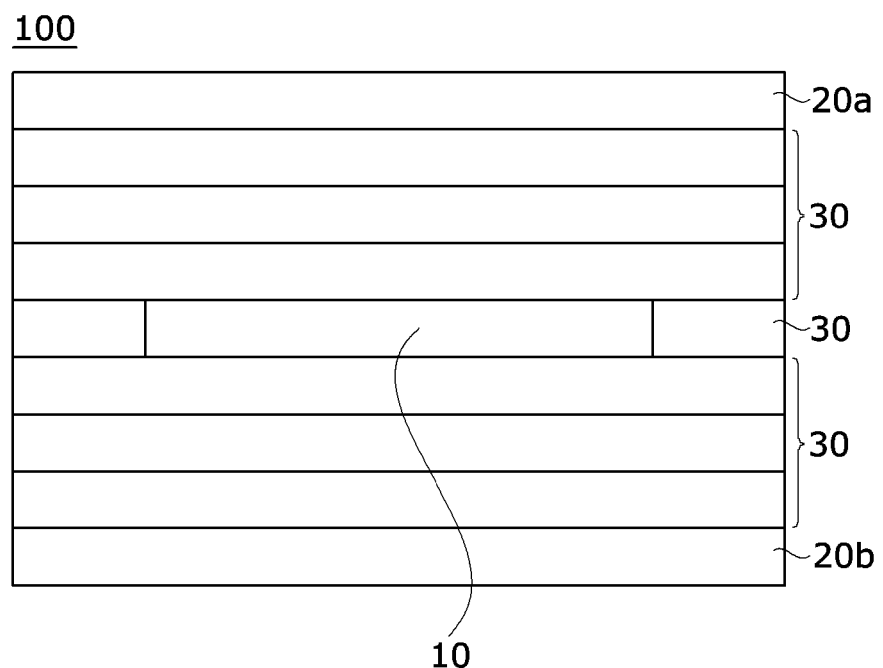

[Figure 3]
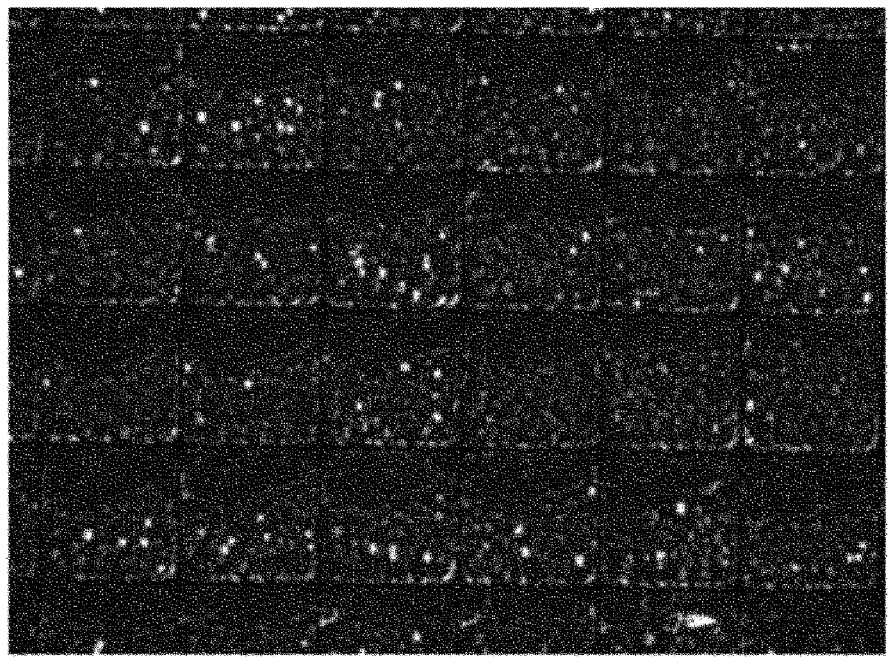

[Figure 4]
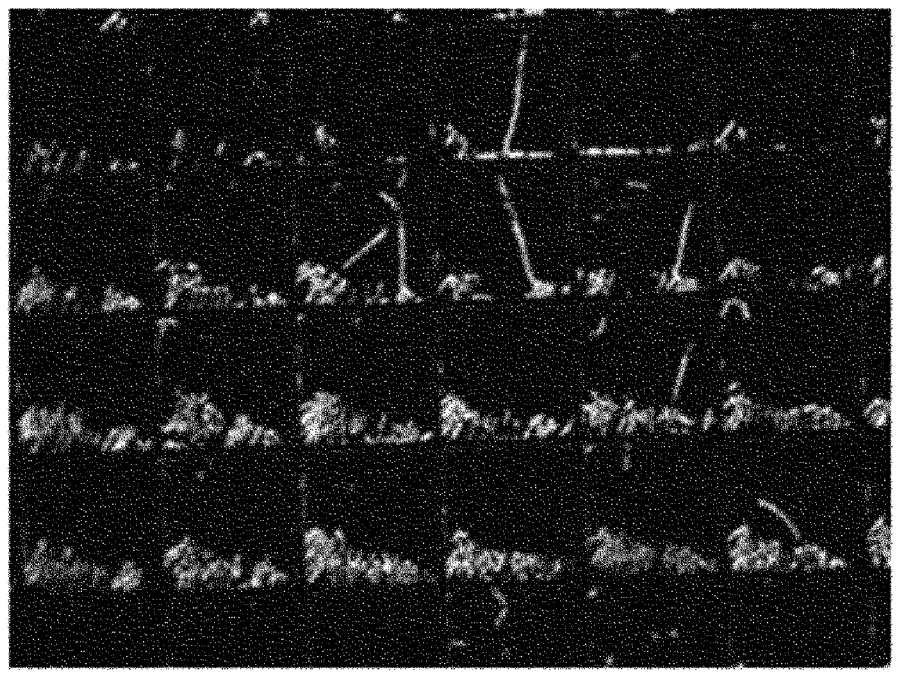

[Figure 5]
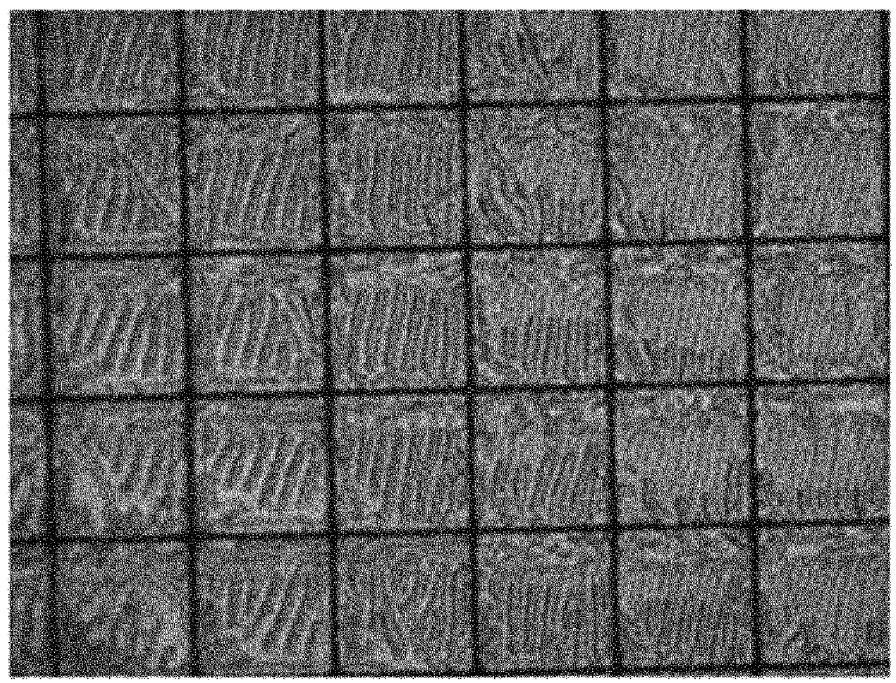

[Figure 6]
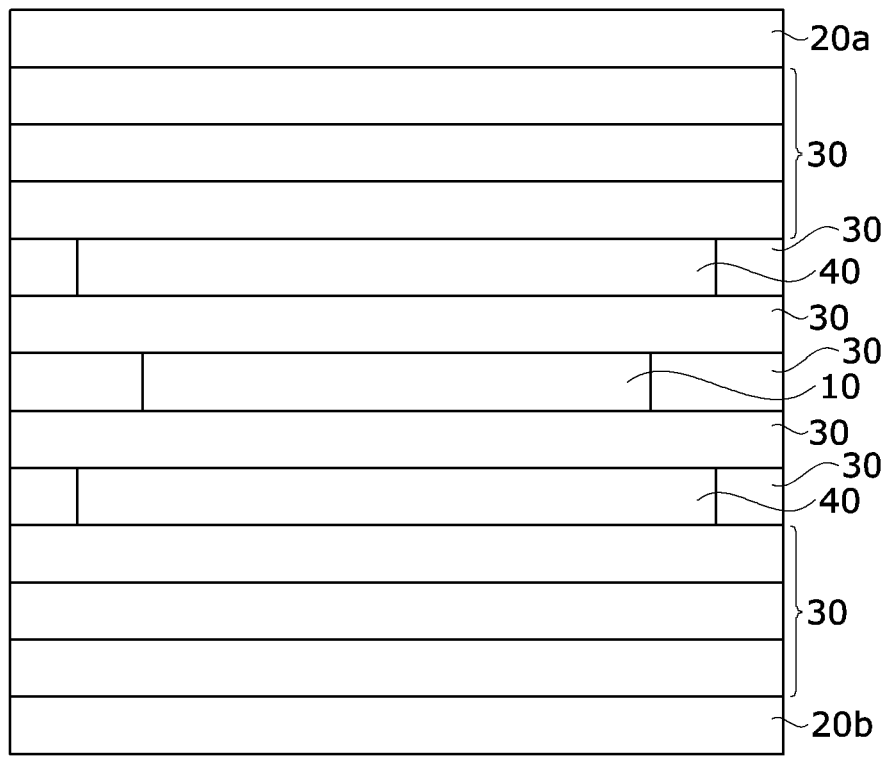

[Figure 7]
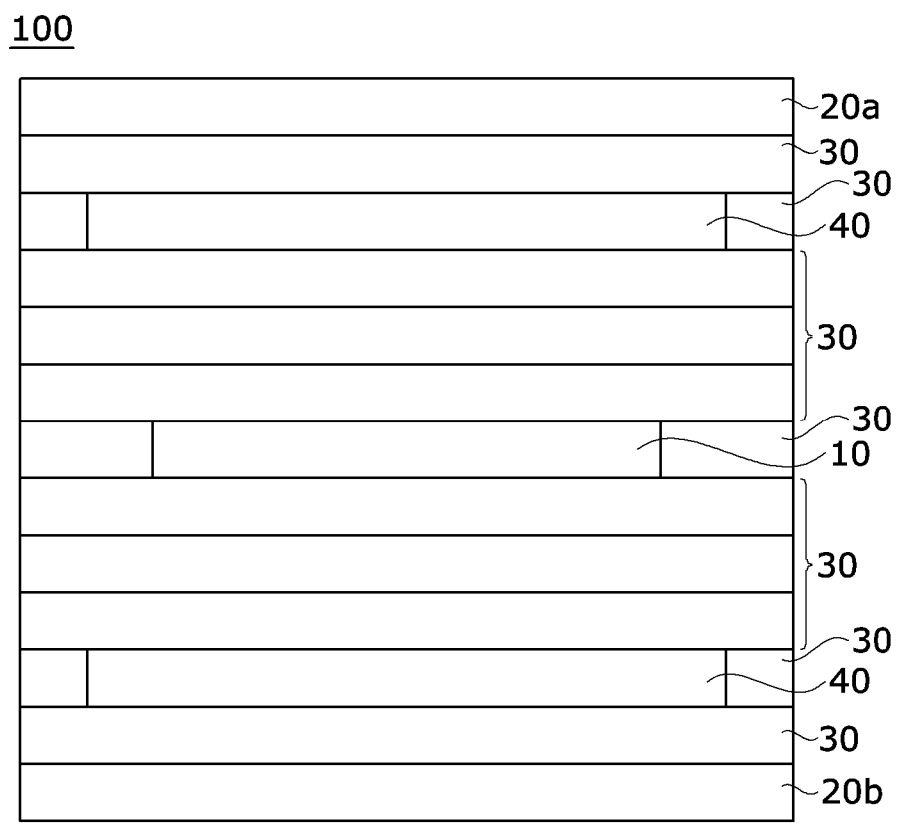

[Figure 8]
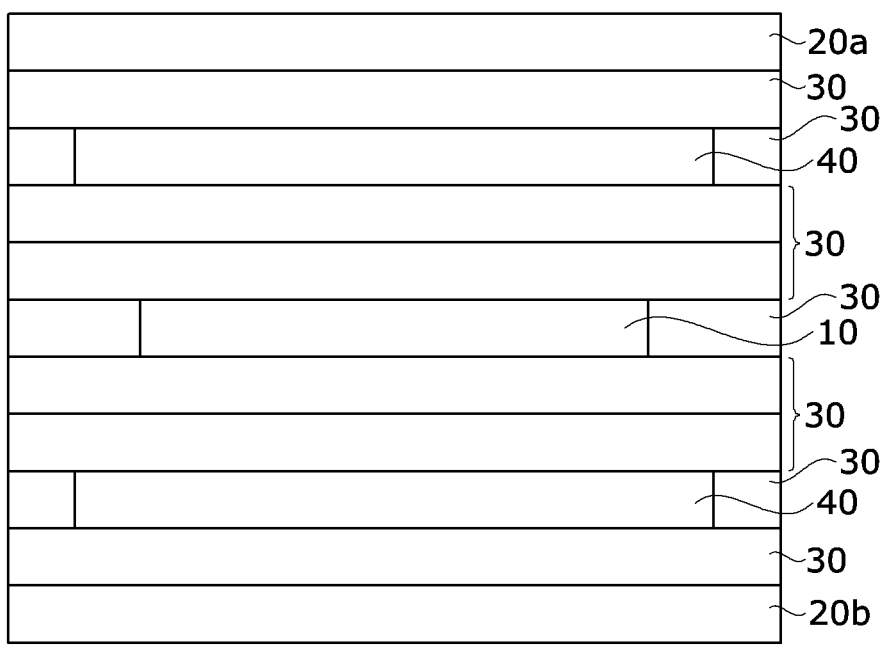

[Figure 9]
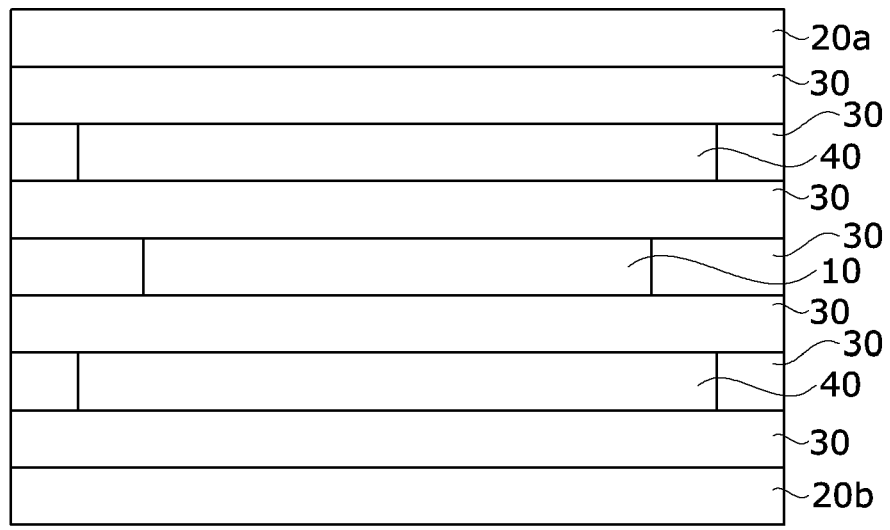
FIG.10A
FIG.10B
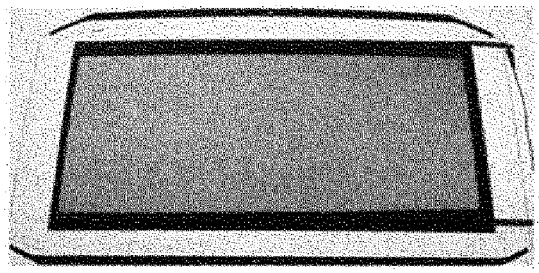
FIG.10C
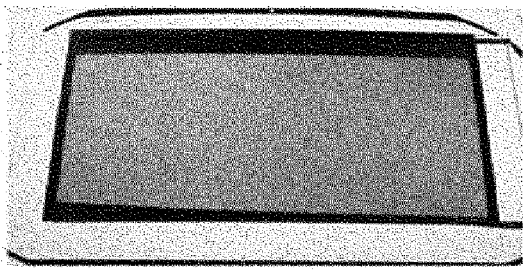
FIG.10D

[Figure 11]
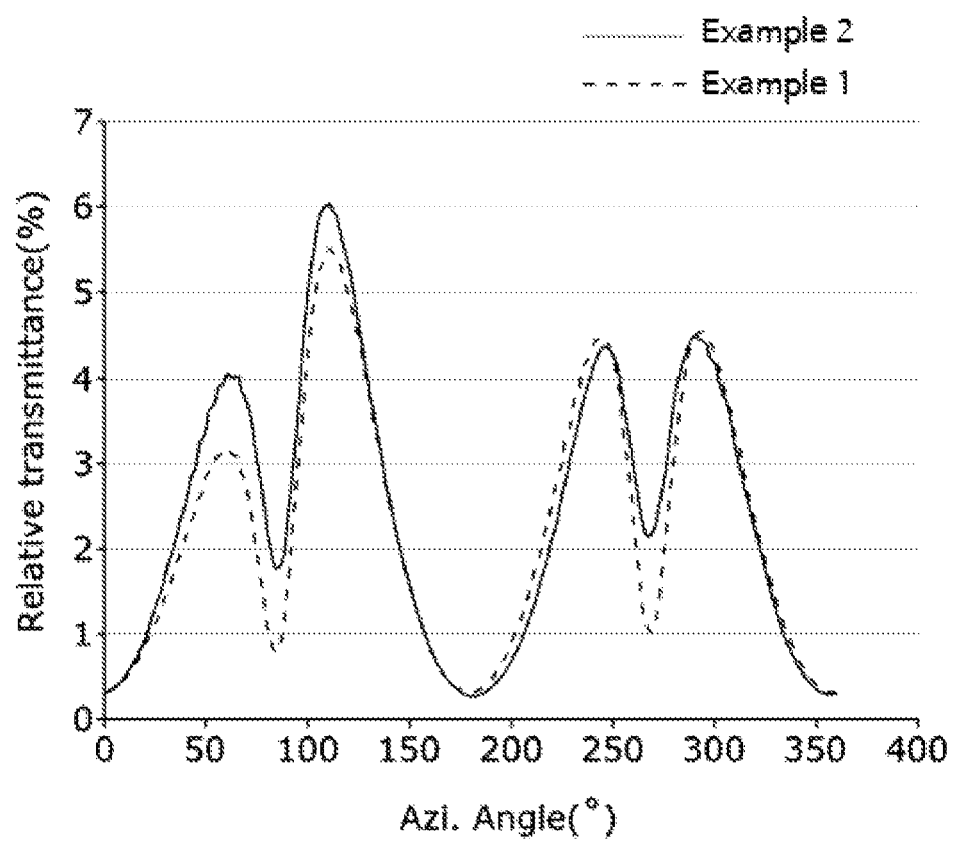

OPTICAL DEVICE

CROSS-REFERENCE TO RELATED APPLICATIONS

This application is a national phase entry under 35 U.S.C. § 371 of International Application No. PCT/KR2021/008393, filed on Jul. 2, 2021, which claims the benefit of priority based on Korean Patent Application No. 10-2020-0084734 filed on Jul. 9, 2020 and Korean Patent Application No. 10-2020-0142095 filed on Oct. 29, 2020, the disclosures of which are incorporated by reference herein.

TECHNICAL FIELD

The present disclosure relates to an optical device.

BACKGROUND ART

For long-term stability and large-area scalability of a liquid crystal film cell using a flexible substrate, it is important that a cell gap between a first base layer (or referred to as 'an upper base layer') and a second base layer (or referred to as 'a lower base layer') is maintained and adhesive force between the first base layer and the second base layer is imparted.

Non-Patent Document 1 discloses a technique for forming an organic film pattern in the form of a column or wall having a cell gap height on one base layer and fixing it to the opposite base layer using an adhesive. However, in such a technique, the adhesive must be located only on the column surface or wall surface, but the technology of micro-stamping the adhesive on the column surface or wall surface has a high process difficulty; it is difficult to control the thickness and area of the adhesive; when the upper and lower base layers are laminated, the adhesive is highly likely to be pushed out; and there is a risk that the adhesive may be contaminated into the alignment film or liquid crystals.

PRIOR ART DOCUMENT

Non-Patent Document

"Tight Bonding of Two Plastic Substrates for Flexible LCDs" SID Symposium Digest, 38, pp. 653-656 (2007)

BRIEF DESCRIPTION OF DRAWINGS

FIG. 1 is a cross-sectional diagram of an exemplary liquid crystal element film of the present disclosure.

FIG. 2 is a cross-sectional diagram of an exemplary optical device of the present disclosure.

FIG. 3 is an image obtained by photographing an optical device in which a pressing defect is generated in a liquid crystal element film by an external pressure.

FIG. 4 is an image obtained by photographing an optical device in which a weak crowding defect is generated in a liquid crystal element film by an external pressure.

FIG. 5 is an image obtained by photographing an optical device in which a strong crowding defect is generated in a liquid crystal element film by an external pressure.

FIG. 6 is a cross-sectional diagram of the optical device manufactured in Example 1 of the present disclosure.

FIG. 7 is a cross-sectional diagram of the optical device manufactured in Example 2 of the present disclosure.

FIG. 8 is a cross-sectional diagram of the optical device manufactured in Example 3 of the present disclosure.

FIG. 9 is a cross-sectional diagram of the optical device manufactured in Comparative Example 1 or 2 of the present disclosure.

FIGS. 10A to 10D are images obtained by photographing the optical devices manufactured in Examples 1 and 2.

FIG. 11 is results of measuring transmittance of the optical devices manufactured in Examples 1 and 2.

DISCLOSURE

Technical Problem

In order that a cell gap of a liquid crystal cell is maintained and attachment force between a first base layer and a second base layer is secured, it may be considered that a spacer and an alignment film are formed on the second base layer, a pressure-sensitive adhesive having both liquid crystal orientation force and attachment force is formed on the first base layer, and then the base layers are laminated. However, such a structure is vulnerable to external pressure due to the very low modulus of the pressure-sensitive adhesive layer, whereby it is difficult to obtain good appearance quality in an autoclave process at elevated temperature and pressure. Specifically, when the structural stability of the liquid crystal cell is not secured in the autoclave process, defects such as cell gap collapses or liquid crystal flow/crowding occur, which cause deterioration of the electro-optical properties and appearance uniformity of the liquid crystal cell.

It is an object of the present disclosure to provide an optical device capable of securing structural stability and good quality uniformity by properly maintaining a cell gap of a liquid crystal cell, maintaining excellent attachment force in a first base layer and a second base layer, and minimizing defects such as pressing or crowding.

Technical Solution

Among the physical properties mentioned in this specification, when the measured temperature affects the results, the relevant physical property is a physical property measured at room temperature, unless otherwise specified. The term room temperature is a natural temperature without heating or cooling, which is usually a temperature in the range of about 10° C. to 30° C., or about 23° C. or about 25° C. or so. In addition, unless otherwise specified in the specification, the unit of temperature is ° C.

Among the physical properties mentioned in this specification, when the measured pressure affects the results, the relevant physical property is a physical property measured at normal pressure, unless otherwise specified. The term normal pressure is a natural pressure without pressurization or depressurization, where usually about 1 atmosphere or so is referred to as normal pressure.

The present disclosure relates to an optical device. The optical device comprises a liquid crystal element film.

FIG. 1 is a cross-sectional diagram of an exemplary liquid crystal element film included in the optical device of the present disclosure. As shown in FIG. 1, the liquid crystal element film (10) included in the optical device comprises a first base layer (or referred to as 'an upper base layer') (11a), a second base layer (or referred to as 'a lower base layer') (11b) disposed opposite to the first base layer, and a liquid crystal layer (16) positioned between the first and second base layers.

As each of the first base layer (11a) and the second base layer (11b), for example, an inorganic film made of glass or the like, or a plastic film may be used. As the plastic film, a PEN (polyethylene-naphthalate), PI (polyimide), COP (cyclo-olefin polymer), TAC (tri-acetyl-cellulose), PET (polyethyleneterephthalate) or PC (polycarbonate) film, and the like may be used, without being limited thereto. A coating layer of gold; silver; or a silicon compound such as silicon dioxide or silicon monoxide, or a functional layer such as an antireflection layer may also be present in the base layer as needed.

As one example, each of the first and second base layers may have a thickness of about 10 μm to about 1,000 μm. As another example, the base layers may each have a thickness of about 20 μm or more, 40 μm or more, 60 μm or more, 80 μm or more, 100 μm or more, 120 μm or more, 140 μm or more, 160 μm or more, or about 180 μm or more, and may be about 900 μm or less, 800 μm or less, 700 μm or less, 600 μm or less, 500 μm or less, or about 400 μm or less. When the thickness of the base layer satisfies the above range, it is possible to reduce appearance defects such as wrinkles at the time of manufacturing an optical device by laminating the liquid crystal element film comprising the base layers with outer substrates to be described below.

The liquid crystal element film comprises a liquid crystal layer comprising at least a liquid crystal compound.

As the liquid crystal compound, a liquid crystal compound, the orientation direction of which may be changed by application of an external action, may be used. In this specification, the term "external action" may mean any external factor that may affect the behavior of a material included in the liquid crystal layer, for example, an external voltage or the like. Therefore, the state where there is no external action may mean a state where there is no application of an external voltage or the like.

The type and physical properties of the liquid crystal compound may be appropriately selected in consideration of the purpose of the present disclosure. In one example, the liquid crystal compound may be a nematic liquid crystal or a smectic liquid crystal. The nematic liquid crystal may mean a liquid crystal that rod-shaped liquid crystal molecules are arranged in parallel in the long-axis direction of the liquid crystal molecules although there is no regularity in their positions. The smectic liquid crystal may mean a liquid crystal that rod-shaped liquid crystal molecules are regularly arranged to form a layered structure and are arranged in parallel with regularity in the long axis direction. According to one example of the present disclosure, the liquid crystal compound may be a nematic liquid crystal compound.

As the nematic liquid crystal compound, one having a clearing point of, for example, about 40° C. or more, about 50° C. or more, about 60° C. or more, about 70° C. or more, about 80° C. or more, about 90° C. or more, about 100° C. or more, or about 110° C. or more, or having a phase transition point in the above range, that is, a phase transition point to an isotropic phase on a nematic phase, can be selected. In one example, the clearing point or phase transition point may be about 160° C. or less, about 150° C. or less, or about 140° C. or less.

The liquid crystal compound may be a non-reactive liquid crystal compound. The non-reactive liquid crystal compound may mean a liquid crystal compound having no polymerizable group. The polymerizable group may be exemplified by an acryloyl group, an acryloyloxy group, a methacryloyl group, a methacryloyloxy group, a carboxyl group, a hydroxy group, a vinyl group or an epoxy group, and the like, but is not limited thereto, and a functional group known as the polymerizable group may be included.

The liquid crystal compound may have dielectric constant anisotropy of a positive number or a negative number. The absolute value of the dielectric constant anisotropy of the liquid crystal compound may be appropriately selected in consideration of the purpose of the present disclosure. The term "dielectric constant anisotropy ($\Delta\varepsilon$)" may mean a difference ($\varepsilon// - \varepsilon\perp$) between the horizontal dielectric permittivity ($\varepsilon//$) and the vertical permittivity ($\varepsilon\perp$) of the liquid crystal. In this specification, the term horizontal permittivity ($\varepsilon//$) means a dielectric constant value measured along the direction of an electric field in a state where a voltage is applied so that the director of the liquid crystal and the direction of the electric field by the applied voltage are substantially horizontal, and the vertical permittivity ($\varepsilon\perp$) means a dielectric constant value measured along the direction of an electric field in a state where a voltage is applied so that the director of the liquid crystal and the direction of the electric field by the applied voltage are substantially perpendicular. The dielectric constant anisotropy of the liquid crystal molecules may be in a range of 5 to 25.

The refractive index anisotropy of the liquid crystal compound may be appropriately selected in consideration of the purpose of the present disclosure. In this specification, the term "refractive index anisotropy" may mean a difference between an extraordinary refractive index and an ordinary refractive index of a liquid crystal compound. The refractive index anisotropy of the liquid crystal compound may be, for example, 0.01 to 0.3. The refractive index anisotropy may be 0.01 or more, 0.05 or more, or 0.07 or more, and may be 0.3 or less, 0.2 or less, 0.15 or less, or 0.13 or less.

The liquid crystal layer may further comprise a dichroic dye. When the liquid crystal layer comprises a dichroic dye, the cell gap fluctuation is less affected upon a lamination process of outer substrates even if the liquid crystal element film comprises a pressure-sensitive adhesive layer, so that there is an advantage that the thickness of the intermediate layers can be made relatively thin for securing structural stability and quality uniformity of the liquid crystal element film.

The dichroic dye may control light transmittance variable properties of the liquid crystal layer. In this specification, the term "dye" may mean a material capable of intensively absorbing and/or deforming light in at least a part or all of the ranges within a visible light region, for example, within a wavelength range of 400 nm to 700 nm, and the term "dichroic dye" may mean a material capable of anisotropic absorption of light in at least a part or all of the ranges of the visible light region.

The liquid crystal layer comprising the liquid crystal compound and the dichroic dye may be a GHLC layer (guest host liquid crystal layer). In this specification, the "GHLC layer (guest host liquid crystal layer)" may mean a functional layer that dichroic dyes are arranged together depending on arrangement of the liquid crystal compound to exhibit anisotropic light absorption characteristics with respect to an alignment direction of the dichroic dyes and the direction perpendicular to the alignment direction, respectively. For example, the dichroic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the dichroic dye is assumed to be a p-type dye.

As the dichroic dye, for example, a known dye known to have a property capable of being aligned according to the alignment state of the liquid crystal compound by a so-called guest host effect may be selected and used. An example of such a dichroic dye includes azo dyes, anthraquinone dyes, methine dyes, azomethine dyes, merocyanine dyes, naphthoquinone dyes, tetrazine dyes, phenylene dyes, quarterrylene dyes, benzothiadiazole dyes, diketopyrrolopyrrole dyes, squaraine dyes or pyromethene dyes, and the like, but the dyes applicable in the present disclosure are not limited thereto.

As the dichroic dye, a dye having a dichroic ratio, that is, a value obtained by dividing the absorption of the polarized light parallel to the long axis direction of the dichroic dye by the absorption of the polarized light parallel to the direction perpendicular to the long axis direction, of 5 or more, 6 or more, or 7 or more, can be used. The dye may satisfy the dichroic ratio in at least a part of the wavelengths or any one wavelength within the wavelength range of the visible light region, for example, within the wavelength range of about 380 nm to 700 nm or about 400 nm to 700 nm. The upper limit of the dichroic ratio may be, for example, 20 or less, 18 or less, 16 or less, or 14 or less or so.

The content of the dichroic dye in the liquid crystal layer may be appropriately selected in consideration of the purpose of the present disclosure. For example, the content of the dichroic dye in the liquid crystal layer may be 0.2 wt % or more. The content of the dichroic dye may specifically be 0.5 wt % or more, 1 wt % or more, 2 wt % or more, or 3 wt % or more. The upper limit of the content of the dichroic dye may be, for example, 10 wt % or less, 9 wt % or less, 8 wt % or less, 6 wt % or less, or 5 wt % or less. If the content of the dichroic dye in the liquid crystal layer is too small, it may be difficult to express the desired transmittance variable characteristics, and it may be insufficient to reduce the thickness of the intermediate layer for reducing the cell gap fluctuation that may occur upon the bonding process of the outer substrates. Meanwhile, if the content of the dichroic dye in the liquid crystal layer is too large, there is a risk of precipitation. Therefore, it may be advantageous that the content of the dichroic dye is within the above range.

The thickness of the liquid crystal layer is not particularly limited, and for example, the thickness of the liquid crystal layer may be about 0.01 μm or more, 0.05 μm or more, 0.1 μm or more, 0.5 μm or more, 1 μm or more, 1.5 μm or more, 2 μm or more, 2.5 μm or more, 3 μm or more, 3.5 μm or more, 4 μm or more, 4.5 μm or more, 5 μm or more, 5.5 μm or more, 6 μm or more, 6.5 μm or more, 7 μm or more, 7.5 μm or more, 8 μm or more, 8.5 μm or more, 9 μm or more, or 9.5 μm or more. The upper limit of the thickness of the liquid crystal layer is not particularly limited, which may generally be about 30 μm or less, 25 μm or less, 20 μm or less, or 15 μm or less.

The liquid crystal layer may switch between a first orientation state and a second orientation state different from the first orientation state. The switching may be adjusted, for example, through the application of external energy such as a voltage. For example, the liquid crystal layer may maintain any one of the first and second orientation states in a state where no voltage is applied, and may be switched to the other orientation state by voltage application.

In one example, the first orientation state may be a twist orientation state. That is, the liquid crystal layer may switch between twist orientation and an orientation state different from the twist orientation through the application of external energy.

In one example, the liquid crystal layer may switch between twist orientation and a vertical orientation state. In one example, the liquid crystal layer may be in a vertical orientation state in a state where no voltage is applied, and may be in a twist orientation state in a state where a voltage is applied.

In this specification, the "vertical orientation state" is a state where the directors of the liquid crystal compound in the liquid crystal layer are arranged approximately perpendicular to the plane of the liquid crystal layer, where for example, the angle formed by the director of the liquid crystal compound with respect to the plane of the liquid crystal layer may be, for example, in a range of about 80 degrees to 100 degrees or 85 degrees to 95 degrees, or it may form approximately about 90 degrees.

In this specification, the "twist orientation state" may mean a spiral structure in which the directors of liquid crystal compounds in the liquid crystal layer form layers while twisting along an imaginary spiral axis and oriented. The twist orientation state may be implemented in a vertical, horizontal or oblique orientation state. That is, the vertical twist orientation mode is a state where individual liquid crystal compounds form layers while twisting along the spiral axis in a vertically oriented state; the horizontal twist orientation mode is a state where individual liquid crystal compounds form layers while twisting along the spiral axis in a horizontally oriented state; and the oblique twist orientation mode is a state where individual liquid crystal compounds form layers while twisting along the spiral axis in an obliquely oriented state. According to the present disclosure, the twist orientation state may be the twist orientation state of the horizontal orientation state.

In the twist orientation state, the ratio (d/p) of the thickness (d) to the pitch (p) of the liquid crystal layer may be 20 or less, and the lower limit may be 0.5 or more. When the ratio (d/p) of the thickness (d) to the pitch (p) in the twist orientation state is within the above range, the optical device may exhibit excellent light transmittance variable characteristics even in a state without any polarizer. In general, when the ratio d/p is 0.7 or more and less than 2.5, it may be called an STN (super twisted nematic) mode, and when the ratio d/p is 2.5 or more, it may be called an HTN (highly twisted nematic) driving mode.

The pitch (p) of the liquid crystal layer can be measured by a measurement method using a wedge cell, and specifically, can be measured by a method described in D. Podolskyy et al. Simple method for accurate measurements of the cholesteric pitch using a "stripe-wedge Grandjean-Cano cell" (Liquid Crystals, Vol. 35, No. 7, July 2008, 789-791). The ratio (d/p) can be achieved by introducing an appropriate amount of a chiral dopant into the liquid crystal layer.

The chiral agent (or chiral dopant) that can be included in the liquid crystal layer can be used without particular limitation as long as it can induce a desired rotation (twisting) without deteriorating the liquid crystallinity, for example, the nematic regularity. The chiral agent for inducing rotation in the liquid crystal compound needs to include at least chirality in the molecular structure. The chiral agent may be exemplified by, for example, a compound having one or two or more asymmetric carbons, a compound having an asymmetric point on a heteroatom, such as a chiral amine or a chiral sulfoxide, or a compound having axially asymmetric and optically active sites such as cumulene or binaphthol. The chiral agent may be, for example, a low molecular weight compound having a molecular weight of 1,500 or less. As the chiral agent, commercially available chiral nematic liquid crystals, for example, chiral dopant liquid crystal S811 commercially available from Merck Co., Ltd. or BASF's LC756 may also be used.

The application ratio of the chiral dopant is selected so that the desired ratio (d/p) can be achieved. In general, the content (wt %) of the chiral dopant may be calculated by an equation of 100/HTP (helical twisting power)×pitch (p) (nm). The HTP represents the strength of the twist of the chiral dopant, where the content of the chiral dopant may be determined in consideration of the desired pitch with reference to the above method.

The liquid crystal element film (10) may comprise a spacer (14) for maintaining a distance between the first and second base layers. The distance between the first base layer and the second base layer may be maintained by the spacer (14). The liquid crystal layer may exist in a region where the spacer does not exist between the first base layer and the second base layer.

The spacer may be a patterned spacer. The spacer may have a column shape or a partition wall shape. The partition wall may partition the space between the second base layer and the first base layer into two or more spaces. In the region where the spacer does not exist, other films or other layers present in the second base layer may be exposed. For example, the conductive layer may be exposed in a region where the spacer does not exist. The alignment film may cover the spacer and the conductive layer exposed in the region where the spacer is not present. In the liquid crystal element film in which the first base layer and the second base layer are bonded together, the alignment film present on the spacer of the second base layer and the pressure-sensitive adhesive layer of the first base layer may be in contact with each other.

The liquid crystal compound and the above-described additives, for example, the dichroic dye, the chiral agent, and the like may be present in the region between the first base layer and the second base layer where the spacer does not exist. The shape of the spacer is not particularly limited, which can be applied without limitation so as to have, for example, a circle, an ellipse, or other polygonal-shaped polyhedrons.

The spacer may comprise a curable resin. The type of the curable resin is not particularly limited, where for example, a thermosetting resin or a photo-curable resin, for example, an ultraviolet curable resin may be used. As the thermosetting resin, for example, a silicone resin, a silicon resin, a furan resin, a polyurethane resin, an epoxy resin, an amino resin, a phenol resin, a urea resin, a polyester resin or a melamine resin, and the like may be used, without being limited thereto. As the ultraviolet curable resin, typically an acrylic polymer, for example, a polyester acrylate polymer, a polystyrene acrylate polymer, an epoxy acrylate polymer, a polyurethane acrylate polymer or a polybutadiene acrylate polymer, a silicone acrylate polymer or an alkyl acrylate polymer, and the like may be used, without being limited thereto.

The spacer may be formed by a patterning process. For example, the spacer may be formed by a photolithography process. The photolithography process may comprise a process of applying a curable resin composition on a base layer or a conductive layer and then irradiating it with ultraviolet rays via a pattern mask. The pattern mask may be patterned into an ultraviolet transmitting region and an ultraviolet blocking region. The photolithography process may further comprise a process of washing the curable resin composition irradiated with ultraviolet rays. The region irradiated with ultraviolet rays is cured, and the region irradiated with no ultraviolet rays remains in a liquid phase, so that it is removed through the washing process, whereby it can be patterned into a partition wall shape. In the photolithography process, a release treatment may be performed on the pattern mask in order to easily separate the resin composition and the pattern mask after ultraviolet irradiation, or a release paper may also be placed between the layer of the resin composition and the pattern mask.

The width (line width), spacing (pitch), thickness and area of the spacer may be appropriately selected within a range without impairing the purpose of the present disclosure. For example, the width (line width) of the spacer may be in a range of 10 μm to 500 μm or in a range of 10 μm to 50 μm. The spacing (pitch) of the spacer may be in a range of 10 μm to 1000 μm or in a range of 100 μm to 1000 μm. The area of the spacer may be about 5% or more and may be 50% or less, relative to 100% of the total area of the second base layer. When the area of the spacer is within the above range, it may be advantageous to ensure excellent electro-optical properties while adequately securing attachment force between the first base layer and the second base layer. The thickness of the spacer may range, for example, from 1 μm to 30 μm or from 3 μm to 20 μm.

The spacer may be a spacer whose optical density is measured within a range of 1.1 to 4. The optical density can be obtained by measuring transmittance (unit: %) to the spacer and then substituting it into the equation of the optical density (optical density=−log10(T), where T is the transmittance). Meanwhile, the method for measuring the transmittance to the spacer is not particularly limited, where it may be measured by a known method. For example, the transmittance of the spacer may be measured using x-rite's 341C.

In an optical device capable of adjusting the transmittance, color and/or reflectivity of light, a region in which a spacer exists becomes an optically inactive region, but in the present disclosure, the occurrence of light leakage or the like may be prevented upon driving the device through the application of the spacer with the above-mentioned optical density and the uniform optical performance may be ensured.

As one example, the liquid crystal element film (10) may further comprise conductive layers (12). The conductive layers may be formed on the first and second base layers (11a, 11b), respectively. In addition, the conductive layer may be formed on the surface of the base layer facing the liquid crystal layer (16).

The conductive layer (12) is a constitution for applying a voltage to the liquid crystal layer, where a known conductive layer may be applied without particular limitation. As the conductive layer, for example, a conductive polymer, a conductive metal, a conductive nanowire, a metal oxide such as ITO (indium tin oxide), carbon nanotubes or graphene, and the like may be applied. An example of the conductive layer that can be applied in the present disclosure is not limited to the foregoing, and all kinds of conductive layers known to be applicable to the liquid crystal element film in this field may be used.

As one example, the liquid crystal element film may further comprise a pressure-sensitive adhesive layer positioned between the conductive layer (12) positioned on the surface of the first base layer (11a) facing the liquid crystal layer, and the liquid crystal layer (16).

The pressure-sensitive adhesive layer may be optically transparent. The pressure-sensitive adhesive layer may have average transmittance of about 80% or more, 85% or more, 90% or more, or 95% or more for the visible light region, for example, a wavelength of 380 nm to 780 nm.

The pressure-sensitive adhesive layer may be a liquid crystal orientational pressure-sensitive adhesive layer. The pressure-sensitive adhesive layer may be, for example, a vertically orientational pressure-sensitive adhesive layer or a horizontally orientational pressure-sensitive adhesive layer. In this specification, the "vertically orientational pressure-sensitive adhesive" may mean a pressure-sensitive adhesive having attachment force capable of boding the first base layer and the second base layer while imparting vertical orientation force to the adjacent liquid crystal compound. In this specification, the "horizontally orientational pressure-sensitive adhesive" may mean a pressure-sensitive adhesive having attachment force capable of bonding the first base layer and the second base layer while imparting horizontal orientation force to the adjacent liquid crystal compound. The pretilt angle of the adjacent liquid crystal compound with respect to the vertically orientational pressure-sensitive adhesive may be in a range of 80 degrees to 90 degrees, 85 degrees to 90 degrees or about 87 degrees to 90 degrees, and the pretilt angle of the adjacent liquid crystal compound with respect to the horizontally orientational pressure-sensitive adhesive may be in a range of 0 degrees to 10 degrees, 0 degrees to 5 degrees or 0 degrees to 3 degrees.

In this specification, the pretilt angle may mean an angle formed by a director of a liquid crystal compound with respect to a plane horizontal to a liquid crystal orientational pressure-sensitive adhesive or an alignment film in a state where no voltage is applied. In this specification, the director of the liquid crystal compound may mean the optical axis or the slow axis of the liquid crystal layer. Alternatively, the director of the liquid crystal compound may mean a long axis direction when the liquid crystal compound has a rod shape, and may mean an axis parallel to the normal direction of the disk plane when the liquid crystal compound has a discotic shape.

The thickness of the pressure-sensitive adhesive layer may be, for example, in a range of 3 μm to 15 μm. When the thickness of the pressure-sensitive adhesive layer is within the above range, it may be advantageous to minimize defects such as pressing or crowding of the pressure-sensitive adhesive when used in the manufacture of a liquid crystal element film, while securing attachment force between the first base layer and the second base layer.

As the pressure-sensitive adhesive layer, various types of pressure-sensitive adhesives known in the industry as a so-called OCA (optically clear adhesive) may be appropriately used. The pressure-sensitive adhesive may be different from an OCR (optically clear resin) type adhesive which is cured after the object to be attached is bonded in that it is cured before the object to be attached is bonded. As the pressure-sensitive adhesive, for example, an acrylic, silicone-based, epoxy-based or urethane-based pressure-sensitive adhesive may be applied.

The pressure-sensitive adhesive layer may comprise a cured product of a pressure-sensitive adhesive resin. In one example, the pressure-sensitive adhesive layer may comprise a silicone-based pressure-sensitive adhesive. The silicone pressure-sensitive adhesive may comprise a cured product of a curable silicone compound as the pressure-sensitive adhesive resin.

The type of the curable silicone compound is not particularly limited, and for example, a heat-curable silicone compound or an ultraviolet-curing silicone compound may be used. The curable silicone compound may be referred to as a pressure-sensitive adhesive resin.

In one example, the curable silicone compound may be an addition-curing silicone compound.

Specifically, the addition-curing silicone compound may be exemplified by (1) an organopolysiloxane containing two or more alkenyl groups in the molecule and (2) an organopolysiloxane containing two or more silicon-bonded hydrogen atoms in the molecule, but is not limited thereto. Such a silicone compound can form a cured product by addition reaction, for example, in the presence of a catalyst to be described below.

A more specific example of the (1) organopolysiloxane, which can be used in the present disclosure, may include a dimethylsiloxane-methylvinylsiloxane copolymer blocking with trimethylsiloxane groups at both ends of the molecular chain, a methylvinylpolysiloxane blocking with trimethylsiloxane groups at both ends of the molecular chain, a dimethylsiloxane-methylvinylsiloxane-methylphenylsiloxane copolymer blocking with trimethylsiloxane groups at both ends of the molecular chain, a dimethylpolysiloxane blocking with dimethylvinylsiloxane groups at both ends of the molecular chain, a methyl vinylpolysiloxane blocking with dimethylvinylsiloxane groups at both ends of the molecular chain, a dimethylsiloxane-methylvinylsiloxane copolymer blocking with dimethylvinylsiloxane groups at both ends of the molecular chain, a dimethylsiloxane-methylvinylsiloxane-methylphenylsiloxane copolymer blocking with dimethylvinylsiloxane groups at both ends of the molecular chain, an organopolysiloxane copolymer comprising a siloxane unit represented by $R1_2SiO_{1/2}$ and a siloxane unit represented by $R1_2R2SiO_{1/2}$ and a siloxane unit represented by $SiO_{4/2}$, an organopolysiloxane copolymer comprising a siloxane unit represented by $R1_2R2SiO_{1/2}$ and a siloxane unit represented by $SiO_{4/2}$, an organopolysiloxane copolymer comprising a siloxane unit represented by $R1R2SiO_{1/2}$ and a siloxane unit represented by $R1SiO_{3/2}$ or a siloxane unit represented by $R2SiO_{3/2}$, and a mixture of two or more of the foregoing, but is limited thereto. Here, R1 is a hydrocarbon group other than an alkenyl group, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group, or a 3,3,3-trifluoropropyl group, and the like. In addition, here, R2 is an alkenyl group, which may be, specifically, a vinyl group, an allyl group, a butenyl group, a pentenyl group, a hexenyl group or a heptenyl group, and the like.

A more specific example of the (2) organopolysiloxane, which can be used in the present disclosure, may include a methylhydrogenpolysiloxane blocking with trimethylsiloxane groups at both ends of the molecular chain, a dimethylsiloxane-methylhydrogen copolymer blocking with trimethylsiloxane groups at both ends of the molecular chain, a dimethylsiloxane-methylhydrogensiloxane-methylphenylsiloxane copolymer blocking with trimethylsiloxane groups at both ends of the molecular chain, a dimethylpolysiloxane blocking with dimethylhydrogensiloxane groups at both ends of the molecular chain, a dimethylsiloxane-methylphenylsiloxane copolymer blocking with dimethylhydrogensiloxane groups at both ends of the molecular chain, a methylphenylpolysiloxane blocking with dimethylhydrogensiloxane groups at both ends of the molecular chain, an organopolysiloxane copolymer comprising a siloxane unit represented by $R13SiO_{1/2}$, a siloxane unit represented by $R12HSiO_{1/2}$ and a siloxane unit represented by $SiO_{4/2}$, an organopolysiloxane copolymer comprising a siloxane unit represented by $R1_2HSiO_{1/2}$ and a siloxane unit represented by $SiO_{4/2}$, an organopolysiloxane copolymer comprising a siloxane unit represented by $R1HSiO_{2/2}$ and a siloxane unit represented by $R1SiO_{3/2}$ or a siloxane unit represented by $HSiO_{3/2}$ and a mixture of two or more of the foregoing, but is not limited thereto. Here, R1 is a hydrocarbon group other than an alkenyl group, which may be, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; a halogen-substituted alkyl group such as a chloromethyl group, a 3-chloropropyl group or a 3,3,3-trifluoropropyl group, and the like.

When the pressure-sensitive adhesive layer is a vertical orientation pressure-sensitive adhesive layer, the pressure-sensitive adhesive layer may have a surface energy of 16 mN/m or less. The lower limit of the surface energy may be, for example, 5 mN/m or more. When the pressure-sensitive adhesive layer is a horizontal orientation pressure-sensitive adhesive layer, the surface energy may be greater than 16 mN/m. The upper limit of the surface energy may be, for example, 50 mN/m or less. The surface energy can be measured using a drop shape analyzer (KRUSS' DSA100 product). Specifically, a process that deionized water with a known surface tension is dropped on the surface of the pressure-sensitive adhesive to obtain the contact angle is repeated 5 times, thereby obtaining the average value of the resulting five contact angle values, and equally a process that diiodomethane with a known surface tension is dropped thereon to obtain the contact angle is repeated 5 times, thereby obtaining the average value of the resulting five contact angle values. Then, the surface energy was obtained by substituting a numerical value (Strom value) for the surface tension of the solvent by the Owens-Wendt-Rabel-Kaelble method using the obtained average values of the contact angles for deionized water and diiodomethane. The surface energy (γsurface) of the sample can be calculated by considering the dispersion force between nonpolar molecules and the interaction force between polar molecules (γsurface=γdispersion+γpolar), where the ratio of the polar term (γpolar) in the surface energy γsurface can be defined as polarity of the surface.

The first base layer and the second base layer of the liquid crystal element film may be attached to each other by the pressure-sensitive adhesive layer. Specifically, the pressure-sensitive adhesive layer of the first base layer and the spacer of the second base layer may be attached to each other. When the alignment film is formed on the spacer of the second base layer, a region corresponding to the spacer of the alignment film may be attached to the pressure-sensitive adhesive layer of the first base layer.

As one example, the pressure-sensitive adhesive layer may have a storage modulus of 10 MPa or less. In another example, it may be about 9.5 MPa or less, 9 MPa or less, 8.5 MPa or less, or about 2 MPa or less, and may be about 0.005 MPa or more, 0.006 MPa or more, 0.007 MPa or more, 0.008 MPa or more, 0.009 MPa or more, 0.01 MPa or more, 0.05 MPa or more. or about 0.1 MPa or more. In order to overcome the physical limits of the liquid crystal element film, the outer substrates can be bonded together via the intermediate layers on both sides of the liquid crystal element film, but due to the low modulus of the pressure-sensitive adhesive layer, it is vulnerable to an external pressure, whereby defects such as cell gap collapse or liquid crystal flow or crowding may occur. According to the present invention, as described below, the thickness of the intermediate layers included in the optical device is controlled, whereby the defects can be minimized and the structural stability and quality uniformity of the optical device can be secured.

As one example, the liquid crystal element film may further comprise an alignment film (15). The alignment film may be a vertical alignment film or a horizontal alignment film. In this specification, the "horizontal alignment film" may mean a layer comprising an orientational material that imparts horizontal orientation force to a liquid crystal compound present in an adjacent liquid crystal layer. In this specification, the "vertical alignment film" may mean a layer comprising an orientational material that imparts vertical orientation force to a liquid crystal compound present in an adjacent liquid crystal layer. The adjacent liquid crystal compound may have a pretilt angle with respect to the vertical alignment film in the range of 80 degrees to 90 degrees, 85 degrees to 90 degrees, or about 87 degrees to 90 degrees, and the adjacent liquid crystal compound may have a pretilt angle with respect to the horizontal alignment film in the range of 0 degrees to 10 degrees, 0 degrees to 5 degrees or 0 degrees to 3 degrees. Unlike the pressure-sensitive adhesive layer, the alignment film may not have adhesive force for bonding the first base layer and the second base layer. In one example, the alignment film may have peel force close to zero with regard to the first base layer in the state of the liquid crystal element film of FIG. 1.

The alignment film may be a rubbing alignment film or a photo-alignment film. The orientation direction of the alignment film may be a rubbing direction in the case of a rubbing alignment film and a direction of polarized light to be irradiated in the case of a photo-alignment film, where such an orientation direction can be confirmed by a detection method using an absorption-type linear polarizer. Specifically, the orientation direction can be confirmed by disposing an absorption-type linear polarizer on one side of the liquid crystal layer in a state where the liquid crystal compound included in the liquid crystal layer is horizontally oriented, and measuring transmittance while rotating the polarizer at 360 degrees. When the side of the liquid crystal layer or the absorption-type linear polarizer is irradiated with light in the above state and simultaneously the luminance (transmittance) is measured from the other side, the transmittance tends to be low, if the absorption axis or transmission axis coincides with the orientation direction of the liquid crystal alignment film, where the orientation direction can be confirmed through simulation reflecting the refractive index anisotropy of the applied liquid crystal compound or the like. A method of confirming the orientation direction according to the mode of the liquid crystal layer is known, and in the present disclosure, the orientation direction of the alignment film can be confirmed by such a known method.

The alignment film may comprise one or more selected from the group consisting of a material known to exhibit orientation ability by rubbing orientation such as a polyimide compound, a poly(vinyl alcohol) compound, a poly(amic acid) compound, a polystyrene compound, a polyamide compound and a polyoxyethylene compound, such as a polyimide compound, a polyamic acid compound, a polynorbornene compound, or a material known to exhibit orientation ability by light irradiation such as a phenylmaleimide copolymer compound, a polyazobenzene compound, a polyethylencimide compound, a polyvinylalcohol compound, a polyamide compound, a polyethylene compound, a polystyrene compound, a polyphenylenephthalamide compound, a polyester compound, a CMPI (chloromethylated polyimide) compound, a PVCI (polyvinylcinnamate) compound and a polymethyl methacrylate compound, but is not limited thereto.

As one example, the alignment film (15) may be positioned on the conductive layer (12) positioned on the surface of the second base layer (11b) facing the liquid crystal layer. Specifically, when the pressure-sensitive adhesive layer (13) is positioned between the conductive layer (12) positioned on the surface of the first base layer (11a), and the liquid crystal layer, the alignment film may be positioned on the conductive layer (12) positioned on the surface of the second base layer (11b). At this time, the aforementioned spacer (14) may be formed in a patterned structure on the conductive layer (12) positioned on the surface of the second base layer (11b), and the alignment film may be positioned on the conductive layer on which the patterned spacer is formed. The liquid crystal element film (10) having the structure shown in FIG. 1 may be manufactured by laminating the base layer in which the pressure-sensitive adhesive layer is formed on the conductive layer and the base layer in which the spacer and the alignment film are formed on the conductive layer. Meanwhile, since the pressure-sensitive adhesive layer positioned between the conductive layer (12) positioned on the surface of the first base layer (11a), and the liquid crystal layer may have liquid crystal orientation characteristics, the alignment film may not be included on the surface of the first base layer facing the liquid crystal layer.

The structure in which the conductive layer formed on the first base layer is in contact with the spacer formed on the second base layer via the pressure-sensitive adhesive layer as described above can improve the adhesive force between the elements constituting the liquid crystal element film, and thus can improve structural stability by preventing peeling between the elements constituting the liquid crystal element film.

As one example, it may further comprise a sealant (17) capable of attaching the first base layer and the second base layer in a state where the distance between the first base layer and the second base layer is maintained. As the material of the sealant, a known material may be used without particular limitation.

The optical device of the present disclosure comprises the above-described liquid crystal element film. FIG. 2 is a cross-sectional diagram of an optical device according to one example of the present disclosure. As shown in FIG. 2, an exemplary optical device (100) of the present disclosure comprises a first outer substrate (20a), a second outer substrate (20b) disposed to face the first outer substrate, the liquid crystal element film (10) positioned between the first and second outer substrates, and intermediate layers (30) positioned between the first outer substrate and the liquid crystal element film and between the liquid crystal element film and the second outer substrate, respectively. The first and second expressions do not prescribe a front-to-back or up-and-down relationship of the outer substrates.

In one example, as the first and second outer substrates, for example, an inorganic substrate or a plastic substrate may be each independently used.

As the inorganic substrate, a known inorganic substrate may be used without particular limitation. As one example, a glass substrate having excellent light transmittance may be used as the inorganic substrate. As the glass substrate, for example, a soda lime glass substrate, a general tempered glass substrate, a borosilicate glass substrate or an alkali-free glass substrate, and the like may be used, without being limited thereto.

As the plastic substrate, a cellulose film such as TAC (triacetyl cellulose) or DAC (diacetyl cellulose); a COP (cycloolefin copolymer) film such as norbornene derivatives; an acrylic film such as PAR (polyacrylate) or PMMA (poly(methyl methacrylate)); a PC (polycarbonate) film; a polyolefin film such as PE (polyethylene) or PP (polypropylene); a PVA (polyvinyl alcohol) film; a PI (polyimide) film; a PSF (polysulfone) film; a PPS (polyphenylsulfone) film; a PES (polyether sulfone) film; a PEEK (polyetheretherketone) film; a PEI (polyetherimide) film; a PEN (polyethylenenaphthalate) film; a PET (polyethyleneterephtalate) film; or a fluororesin film and the like can be used, without being limited thereto.

In the first and second outer substrates (20a, 20b), a coating layer of gold; silver; or a silicon compound such as silicon dioxide or silicon monoxide, or a functional layer such as an antireflection layer may also be present as needed.

The thicknesses of the first and second outer substrates (20a, 20b) are not particularly limited, which may be, for example, about 0.3 mm or more, respectively. In another example, the thickness may be about 0.5 mm or more, 1 mm or more, 1.5 mm or more, or about 2 mm or more, and may also be about 10 mm or less, 9 mm or less, 8 mm or less, 7 mm or less, 6 mm or less, 5 mm or less, 4 mm or less, or about 3 mm or less.

As one example, the first and second outer substrates (20a, 20b) may be a flat substrate or may be a substrate having a curved surface shape. For example, the first and second outer substrates may be simultaneously flat substrates, simultaneously have a curved surface shape, or any one may be a flat substrate and the other may be a substrate having a curved surface shape.

In addition, here, in the case of having the curved surface shape at the same time, the respective curvatures or curvature radii may be the same or different.

In this specification, the curvature or curvature radius may be measured in a manner known in the industry, and for example, may be measured using a contactless apparatus such as a 2D profile laser sensor, a chromatic confocal line sensor or a 3D measuring confocal microscopy. The method of measuring the curvature or curvature radius using such an apparatus is known.

Also, in relation to the first and second outer substrate, for example, when the curvatures or curvature radii on the front surface and the back surface are different, the respective curvatures or curvature radii of the opposing surfaces, that is, the curvature or curvature radius of the surface facing the second outer substrate in the case of the first outer substrate and the curvature or curvature radius of the surface facing the first outer substrate in the case of the second outer substrate may be a reference. Furthermore, when the relevant surface has portions that the curvatures or curvature radii are not constant and different, the largest curvature or curvature radius may be a reference, or the smallest curvature or curvature radius may be a reference, or the average curvature or average curvature radius may be a reference.

Both of the first and second outer substrates (20a, 20b) may have a difference in curvature or curvature radius within about 10%, within 9%, within 8%, within 7%, within 6%, within 5%, within 4%, within 3%, within 2% or within about 1%. When a large curvature or curvature radius is $C_L$ and a small curvature or curvature radius is $C_S$, the difference in curvature or curvature radius is a value calculated by $100 \times (C_L - C_S)/C_S$. In addition, the lower limit of the difference in curvature or curvature radius is not particularly limited. Since the differences in curvatures or curvature radii of the first and second outer substrates can be the same, the difference in curvature or curvature radius may be about 0% or more, or more than about 0%.

The control of such a curvature or curvature radius is useful in a structure in which a liquid crystal element film and/or a polarizer to be described below contacts the intermediate layers as in the optical device of the present disclosure. That is, when the difference in the curvature or curvature radius exceeds 10%, a problem in which the bonded outer substrates are spread due to deterioration of bonding force may occur at the time when the outer substrates and the liquid crystal element film and/or the polarizer are in contact with the intermediate layers to be described below. However, if it is controlled within 10%, it is possible to effectively prevent the problem that the bonded outer substrates are spread due to deterioration of the bonding force.

Both of the first and second outer substrates may have the same curvature sign. In other words, the first and second outer substrates may be bent in the same direction. That is, in the above case, both the center of curvature of the first outer substrate and the center of curvature of the second outer substrate exist in the same portion of the upper part and the lower part of the first and second outer substrates.

When the first and second outer substrates are bent in the same direction, the first and second outer substrates can be more efficiently bonded by the intermediate layers, and after bonding, the bonding force deterioration of the first and second outer substrates and the liquid crystal element film and/or the polarizer can be prevented more effectively.

The specific range of each curvature or curvature radius of the first and second outer substrates (20a, 20b) is not particularly limited. In one example, the curvature radius of each of the first and second outer substrates may be about 100R or more, 200R or more, 300R or more, 400R or more, 500R or more, 600R or more, 700R or more, 800R or more, or about 900R or more, or may be about 10,000R or less, 9,000R or less, 8,000R or less, 7,000R or less, 6,000R or less, 5,000R or less, 4,000R or less, 3,000R or less, 2,000R or less, 1,900R or less, 1,800R or less, 1,700R or less, 1,600R or less, 1,500R or less, 1,400R or less, 1,300R or less, 1,200R or less, 1,100R or less, or about 1,050R or less. Here, R means the degree of curvature of a circle having a radius of 1 mm. Thus, here, for example, 100R is the degree of curvature of a circle having a radius of 100 mm or the curvature radius for such a circle.

The first and second outer substrates may have the same or different curvature radii in the above range. In one example, when the curvatures of the first and second outer substrates are different from each other, the curvature radius of the substrate having a large curvature among them may be within the above range.

In one example, when the curvatures of the first and second outer substrates are different from each other, a substrate having a large curvature among them may be a substrate that is disposed in the gravity direction upon using the optical device.

When the curvature or curvature radius of the first and second outer substrates is controlled as above, the net force, which is the sum of the restoring force and the gravity, may act to prevent the widening, even if the bonding force by the intermediate layer to be described below is decreased.

In the optical device according to one example of the present disclosure, a liquid crystal element film (10) is positioned between the first and second outer substrates (20a, 20b), and intermediate layers (30) are included between the first outer substrate and the liquid crystal element film, and between the liquid crystal element film and the second outer substrate, respectively.

As one example, the intermediate layers have a sum of total thickness of 1,600 μm or more. As another example, the sum of the total thickness of the intermediate layers may be about 1,650 μm or more, 1,700 μm or more, 1,750 μm or more, 1,800 μm or more, 1,850 μm or more, 1,900 μm or more, 1,950 μm or more, 2,000 μm or more, 2,100 μm or more, 2,150 μm or more, or about 2,200 μm or more, and may be about 6,000 μm or less, 5,900 μm or less, 5,800 μm or less, 5,700 μm or less, 5,600 μm or less, 5,500 μm or less, 5,400 μm or less, 5,300 μm or less, 5,200 μm or less, 5,100 μm or less, or about 5,000 μm or less.

The intermediate layers may each have a single-layer structure of one intermediate layer or may be a laminate of two or more sub-intermediate layers. The thickness and number of sub-intermediate layers may be controlled in consideration of the desired thickness of the intermediate layer.

The sum of the total thickness of the intermediate layers means the sum of the thicknesses of the intermediate layers present between the first outer substrate and the liquid crystal element film and between the second outer substrate and the liquid crystal element film.

As one embodiment, as shown in FIG. 2, the sum of the thickness of the sub-intermediate layer laminate positioned between the first outer substrate and the liquid crystal element film and the thickness of the sub-intermediate layer laminate positioned between the second outer substrate and the liquid crystal element film is 1,600 μm or more in total. As another embodiment, the sum of the thickness of the intermediate layer as a single layer between the first outer substrate and the liquid crystal element film and the thickness of the intermediate layer as a single layer between the second outer substrate and the liquid crystal element film is 1,600 μm or more in total.

In order to overcome the physical limits of the liquid crystal element film, the outer substrates can be bonded together via the intermediate layers on both sides of the liquid crystal element film, but due to the low modulus of the pressure-sensitive adhesive layer, it is vulnerable to an external pressure, whereby defects such as cell gap collapse or liquid crystal flow or crowding may occur. By controlling the thickness of the intermediate layers included in the optical device within the above range, the defects can be minimized, and structural stability and uniform appearance characteristics of the optical device can be secured.

When the sum of the total thickness of the intermediate layers is less than 1,600 μm, the pressing defect as shown in FIG. 3 occurs, the weak crowding defect as shown in FIG. 4 occurs or the strong crowding defect as shown in FIG. 5 occurs, in the liquid crystal element film of the optical device, and thus appearance defects occur, whereby the quality of the optical device can be lowered. Meanwhile, when the sum of the total thickness of the intermediate layers exceeds 6,000 μm, electro-optical properties, such as transmittance properties, of the optical device may be deteriorated.

As one example, the total thickness (Ta) of the intermediate layers positioned between the first outer substrate and the liquid crystal element film and the total thickness (Tb) of the intermediate layer positioned between the second outer substrate and the liquid crystal element film may each be in a range of 200 to 3,000 μm. In another example, each of the Ta and Tb may be about 210 μm or more, 220 μm or more, 230 µm or more, 240 µm or more, 250 µm or more, 260 µm or more, 270 µm or more, 280 µm or more, 290 µm or more, 300 µm or more, 310 µm or more, 320 µm or more, 330 µm or more, 340 µm or more, 350 µm or more, or about 300 µm or more, and may be about 2,950 µm or less, 2,900 µm or less, 2,850 µm or less, 2,800 µm or less, 2,750 µm or less, 2,700 µm or less, 2,650 µm or less, or about 2,600 µm or less.

The sum of the total thickness (Ta) of the intermediate layers positioned between the first outer substrate and the liquid crystal element film means the sum of the thicknesses of all intermediate layers present between the first outer substrate and the liquid crystal element film. In addition, the sum of the total thickness (Tb) of the intermediate layers positioned between the second outer substrate and the liquid crystal element film means the sum of the thicknesses of all intermediate layers present between the second outer substrate and the liquid crystal element film. Therefore, when a first polarizer positioned between the first outer substrate and the liquid crystal element film; and a second polarizer positioned between the second outer substrate and the liquid crystal element film, which are described below, are included and intermediate layers are included between the first polarizer and the liquid crystal element film and between the second polarizer and the liquid crystal element film, the sum of the total thickness (Ta) of the intermediate layers positioned between the first outer substrate and the liquid crystal element film means the sum of the thicknesses of the intermediate layer positioned between the first outer substrate and the first polarizer, and the intermediate layer positioned between the first polarizer and the liquid crystal element film, and the sum of the total thickness (Tb) of the intermediate layers positioned between the second outer substrate and the liquid crystal element film means the sum of the thicknesses of the intermediate layer positioned between the second outer substrate and the second polarizer, and the second polarizer and the liquid crystal element film.

The total thickness (Ta) of the intermediate layers positioned between the first outer substrate and the liquid crystal element film and the total thickness (Tb) of the intermediate layer positioned between the second outer substrate and the liquid crystal element film each satisfy the range of 200 to 3,000 µm, it may be more advantageous to improve the appearance defects of the liquid crystal element film.

As one example, the thickness ratio (Ta/Tb) of the total thickness (Ta) of the intermediate layers (30) positioned between the first outer substrate (20a) and the liquid crystal element film (10) to the total thickness (Tb) of the intermediate layers (30) positioned between the second outer substrate (20b) and the liquid crystal element film (10) may be in the range of 0.1 to 10. As another example, the thickness ratio (Ta/Tb) may be about 0.12 or more, about 0.13 or more, or about 0.14 or more, and may be about 9.5 or less, 9.0 or less, 8.5 or less, 8.0 or less, 7.5 or less, or about 7.0 or less. When the thickness ratio is within the range of 0.1 to 10, it is possible to more effectively improve the appearance defects of the liquid crystal element film.

As one example, the intermediate layer (30) may have a Young's modulus (E) in a range of 0.1 MPa to 100 MPa. As another example, the Young's modulus (E) of the intermediate layer may be about 0.2 MPa or more, 0.4 MPa or more, 0.6 MPa or more, 0.8 MPa or more, 1 MPa or more, 5 MPa or more, or about 10 MPa or more, and may be about 95 MPa or less, 80 MPa or less, 75 MPa or less, 70 MPa or less, 65 MPa or less, 60 MPa or less, 55 MPa or less, or about 50 MPa or less.

The Young's modulus (E), for example, can be measured in the manner specified in ASTM D882, and can be measured using the equipment that can cut the film in the form provided by the relevant standard and measure the stress-strain curve (can measure the force and length simultaneously), for example, a UTM (universal testing machine). By selecting the intermediate layer to have the Young's modulus as above, an optical device with excellent durability can be provided.

As one example, in the present disclosure, the intermediate layer (30) may have a coefficient of thermal expansion of 2,000 ppm/K or less. In another example, the coefficient of thermal expansion may be about 1,900 ppm/K or less, 1,700 ppm/K or less, 1,600 ppm/K or less, or about 1.500 ppm/K or less, or may be about 10 ppm/K or more, 20 ppm/K or more, 30 ppm/K or more, 40 ppm/K or more, 50 ppm/K or more, 60 ppm/K or more, 70 ppm/K or more, 80 ppm/K or more, 90 ppm/K or more, 100 ppm/K or more, 200 ppm/K or more, 300 ppm/K or more, 400 ppm/K or more, 500 ppm/K or more, 600 ppm/K or more, 700 ppm/K or more, or about 800 ppm/K or more. The coefficient of thermal expansion of the intermediate layer can be measured, for example, according to the regulations of ASTM D696, where the coefficient of thermal expansion can be calculated by cutting it in the form provided by the relevant standard, and measuring the change in length per unit temperature, and can be measured by a known method such as the TMA (thermo-mechanic analysis). By selecting the intermediate layer to have the coefficient of thermal expansion as above, an optical device with excellent durability can be provided.

The intermediate layer is not particularly limited, and a known adhesive layer satisfying the above-described physical properties, for example, the Young's modulus and coefficient of thermal expansion, and the like, may be used. For example, the intermediate layer is a thermoplastic polyurethane adhesive layer, a polyamide adhesive layer, a polyester adhesive layer, an EVA (ethylene vinyl acetate) adhesive layer, an acrylic adhesive layer, a silicone adhesive layer or a polyolefin adhesive layer, where one satisfying the above-described physical properties can be selected and used.

As one example, the optical device according to the present disclosure may comprise a first polarizer positioned between the first outer substrate and the liquid crystal element film; and a second polarizer positioned between the second outer substrate and the liquid crystal element film. In this specification, the term polarizer means a film, sheet or element having a polarization function. The polarizer is a functional element capable of extracting light vibrating in one direction from incident light vibrating in multiple directions.

The first polarizer and the second polarizer may each be an absorption type polarizer or a reflection type polarizer. In this specification, the absorption type polarizer means an element showing selective transmission and absorption characteristics with respect to incident light. The polarizer may transmit, for example, light vibrating in any one direction from incident light vibrating in multiple directions, and may absorb light vibrating in the other directions. In this specification, the reflection type polarizer means an element showing selective transmission and reflection characteristics with respect to incident light. The polarizer may transmit, for example, light vibrating in any one direction from incident light vibrating in multiple directions, and may reflect light vibrating in the other directions. According to one example of the present disclosure, the polarizer may be an absorption type polarizer.

Each of the first polarizer and the second polarizer may be a linear polarizer. In this specification, the linear polarizer means a case in which the selectively transmitted light is linearly polarized light vibrating in any one direction, and the selectively absorbed or reflected light is linearly polarized light vibrating in a direction perpendicular to the vibration direction of the linearly polarized light. In the case of the absorption type linear polarizer, the light transmission axis and the light absorption axis may be perpendicular to each other. In the case of the reflection type linear polarizer, the light transmission axis and the light reflection axis may be perpendicular to each other.

In one example, each of the first polarizer and the second polarizer may be a stretched polymer film dyed with iodine or an anisotropic dye. As the stretched polymer film, a PVA (poly(vinyl alcohol)) stretched film may be exemplified. In another example, each of the first polarizer and the second polarizer may be a guest-host type polarizer in which a liquid crystal polymerized in an oriented state is a host, and an anisotropic dye arranged according to the orientation of the liquid crystal is a guest. In another example, the first polarizer and the second polarizer may each be a thermotropic liquid crystal film or a lyotropic liquid crystal film.

A protective film, an antireflection film, a retardation film, a pressure-sensitive adhesive layer, an adhesive layer, a surface treatment layer, and the like may be additionally formed on one side or both sides of the first polarizer and the second polarizer, respectively. The retardation film may be, for example, a ¼ wave plate or a ½ wave plate. The ¼ wave plate may have an in-plane retardation value for light having a wavelength of 550 nm in a range of about 100 nm to 180 nm, 100 nm to 150 nm. The ½ wave plate may have an in-plane retardation value for light having a wavelength of 550 nm in a range of about 200 nm to 300 nm or 250 nm to 300 nm. The retardation film may be, for example, a stretched polymer film or a liquid crystal polymerization film.

The transmittance of each of the first polarizer and the second polarizer for light having a wavelength of 550 nm may be in a range of 40% to 50%. The transmittance may mean single transmittance of the polarizer for light having a wavelength of 550 nm. The single transmittance of the polarizer can be measured using, for example, a spectrometer (V7100, manufactured by Jasco). For example, after the air is set to the base line in a state where the polarizer sample (not including the upper and lower protective films) is placed on the apparatus and each transmittance is measured in a state in which the axis of the polarizer sample is vertically and horizontally aligned with the axis of the reference polarizer, the single transmittance can be calculated.

The light transmission axis of the first polarizer and the light transmission axis of the second polarizer may be perpendicular to each other. Specifically, the angle formed by the light transmission axis of the first polarizer and the light transmission axis of the second polarizer may be in the range of 80 degrees to 100 degrees or 85 degrees to 95 degrees. When the light transmission axis of the first polarizer and the light transmission axis of the second polarizer are perpendicular to each other, light leakage and the like may occur depending on the separation distance between the first polarizer and the second polarizer.

According to the present disclosure, the intermediate layers are positioned between the first polarizer and the liquid crystal element film and between the second polarizer and the liquid crystal element film, respectively, where the intermediate layer having a thickness of 380 μm or less may be included. That is, the thicknesses of the intermediate layer between the first polarizer and the liquid crystal element film and the intermediate layer between the second polarizer and the liquid crystal element film may each be 380 μm or less. Through this, by minimizing the separation distance between the first polarizer and the second polarizer, it is possible to secure structural safety of the liquid crystal element film while reducing light leakage. The lower limits of the thickness of the intermediate layer present between the first polarizer and the liquid crystal element film and the intermediate layer present between the second polarizer and the liquid crystal element film may each be 10 μm or more.

In one example, the thicknesses of the intermediate layer positioned between the first outer substrate and the first polarizer and the intermediate layer positioned between the second outer substrate and the second polarizer may each be in a range of 400 μm to 3,000 μm. As another example, in one example, the thicknesses of the intermediate layer positioned between the first outer substrate and the first polarizer and the intermediate layer positioned between the second outer substrate and the second polarizer may each be about 400 μm or more, 500 μm or more, 600 μm or more, 700 μm or more, 800 μm or more, 900 μm or more, 1000 μm or more, or 1100 μm or more, and may each be about 3,000 μm or less, 2.800 μm or less, 2,600 μm or less, 2,400 μm or less, about 2200 μm or less, about 2,000 μm or less, about 1.800 μm or less, about 1,600 μm or less, or about 1,400 μm or less. When the thicknesses of the intermediate layer positioned between the first outer substrate and the first polarizer and the intermediate layer positioned between the second outer substrate and the second polarizer are each within the above ranges, it may be advantageous to secure structural stability and uniform appearance characteristics without appearance defects in the bonding process of the outer substrates, while doing not impair the electro-optical properties of the optical device.

An optical device according to another example of the present disclosure may comprise: a first outer substrate; a second outer substrate disposed to face the first outer substrate; a liquid crystal element film positioned between the first and second outer substrates; and intermediate layers positioned between the first outer substrate and the liquid crystal element film, between the liquid crystal element film and the second outer substrate, and at an outer part of the liquid crystal element film, respectively, wherein the sum of the total thickness of the intermediate layers positioned between the first outer substrate and the liquid crystal element film, and between the liquid crystal element film and the second outer substrate is 1,600 μm or more, and may have a structure in which the liquid crystal element film is encapsulated between the first outer substrate and the second outer substrate by the intermediate layers positioned between the first outer substrate and the liquid crystal element film, between the liquid crystal element film and the second outer substrate, and at the outer part of the liquid crystal element film, respectively.

An optical device according to another example of the present disclosure may comprise: a first outer substrate; a second outer substrate disposed to face the first outer substrate; a liquid crystal element film positioned between the first and second outer substrates; a first polarizer positioned between the first outer substrate and the liquid crystal element film; a second polarizer positioned between the second outer substrate and the liquid crystal element film; and intermediate layers positioned between the first outer substrate and the first polarizer, between the first polarizer and the liquid crystal element film, between the liquid crystal element film and the second polarizer, between the second polarizer and the second outer substrate, and at an outer part of the liquid crystal element film, respectively, wherein the sum of the total thickness of the intermediate layers positioned between the first outer substrate and the first polarizer, between the first polarizer and the liquid crystal element film, between the liquid crystal element film and the second polarizer, and between the second polarizer and the second outer substrate is 1,600 µm or more, and may have a structure in which the liquid crystal element film is encapsulated between the first outer substrate and the second outer substrate by the intermediate layers positioned between the first outer substrate and the first polarizer, between the first polarizer and the liquid crystal element film, between the liquid crystal element film and the second polarizer, between the second polarizer and the second outer substrate, and at the outer part of the liquid crystal element film, respectively.

In the present disclosure, the term outer part of the liquid crystal element film may mean a side part surrounding the liquid crystal element film. Also, in the present disclosure, the term encapsulation may mean that the top surface of the liquid crystal element film and/or the polarizer is covered with the intermediate layers. For example, the structure may be implemented by laminating an outer substrate, an intermediate layer, a liquid crystal element film, an intermediate layer and an outer substrate according to a desired structure, placing the intermediate layer even at the outer part of the liquid crystal element film, and then compressing them in a vacuum state. The durability and weather resistance of the optical device can be greatly improved by such an encapsulation structure, and as a result, it can also be stably applied to outdoor applications such as a sunroof.

The method for manufacturing an optical device of the present disclosure is not particularly limited. In one example, the optical device may be manufactured through an autoclave process for the above-described encapsulation.

For example, the method for manufacturing an optical device may comprise a step of encapsulating the liquid crystal element film and/or the polarizer between the first outer substrate and the second outer substrate through an autoclave process using intermediate layers.

The autoclave process may be performed by disposing intermediate layers, a liquid crystal element film and/or a polarizer between outer substrates according to a desired encapsulation structure, and heating/pressurizing them.

As one example, when a laminate that the first outer substrate (20a), the intermediate layer (30), the liquid crystal element film (10), the intermediate layer (30) and the second outer substrate (20b) are disposed in the above order and an intermediate layer (30) is also disposed on the outer part of the liquid crystal element film is subjected to heating/pressurization by an autoclave process, an optical device as shown in FIG. 2 can be formed. As another example, when a laminate that the first outer substrate (20a), the intermediate layer (30), the first polarizer (40), the intermediate layer (30), the liquid crystal element film (10), the intermediate layer (30), the second polarizer (40), the intermediate layer (30) and the second outer substrate (20b) are disposed in the above order and the intermediate layers (30) are also disposed on the outer parts of the liquid crystal element film and the polarizer is subjected to heating/pressurization by an autoclave process, an optical device as shown in FIG. 6, 7 or 8 can be formed.

The conditions of the autoclave process are not particularly limited, and it may be performed under an appropriate temperature and pressure, for example, depending on the type of the applied intermediate layers. The temperature of a typical autoclave process is about 80° C. or more, 90° C. or more, 100° C. or more, and the pressure is 2 atmospheres or more, without being limited thereto. The upper limit of the process temperature may be about 200° C. or less, 190° C. or less, 180° C. or less, or 170° C. or less or so, and the upper limit of the process pressure may be about 10 atm or less, 9 atm or less, 8 atm or less, 7 atm or less, or 6 atm or less or so.

Such an optical device can be used for various applications, and for example, can be used for eyewear such as sunglasses or AR (augmented reality) or VR (virtual reality) eyewear, an outer wall of a building or a sunroof for a vehicle, and the like.

In one example, the optical device itself may be a sunroof for a vehicle.

For example, in an automobile including an auto body in which at least one opening is formed, the optical device or the sunroof for a vehicle attached to the opening can be mounted and used.

Effects of Invention

The optical device of the present disclosure can secure structural stability and good quality uniformity by maintaining the cell gap of the liquid crystal element film properly, having excellent attachment force between the upper substrate and the lower substrate, and minimizing defects such as pressing or crowding in the bonding process of the outer substrates.

MODE FOR INVENTION

Hereinafter, the present disclosure will be described in detail through Examples, but the scope of the present disclosure is not limited by Examples below.

Measurement Example 1. Measurement of Storage Modulus

The storage modulus was measured using TA's DMA Q800. Specifically, the storage modulus values were recorded under the conditions of a temperature of 25° C., force of 0.01N and a ramp rate of 3°/min in Multi-Frequency-Strain mode.

Liquid Crystal Element Film Production

A polycarbonate film (Keiwa) having a thickness of about 100 µm and a width×height area of 600 mm×300 mm was prepared as a first base layer. ITO (indium-tin-oxide) was deposited on the first base layer to a thickness of 50 nm to form a conductive layer. A pressure-sensitive adhesive composition (KR-3700, Shin-Etsu) was bar-coated on the conductive layer, and then dried at about 150° C. for about 5 minutes to form a pressure-sensitive adhesive layer having a thickness of about 10 µm. The storage modulus of the adhesive layer was about 0.1 MPa. The combination of the first base layer, the conductive layer and the pressure-sensitive adhesive layer is referred to as an upper laminate.

As a second base layer, a polycarbonate film (Keiwa) having a thickness of about 100 µm and a width×height area of 600 mm×300 mm was prepared. On the second base layer, ITO (indium-tin-oxide) was deposited to a thickness of 50 nm to form a conductive layer. An acrylic resin composition (KAD-03, Minuta Tech) was coated on the conductive layer, and then a honeycomb-type spacer was formed by a photolithography method. The pitch of the regular hexagons (closed figure) constituting the honeycomb is about 450 µm, the height is about 12 µm, and the line width is about 30 µm. The area of the closed figure (regular hexagon) formed by the spacer was approximately 2.14 mm². A vertical alignment film (Nissan, SE-5661) was coated on the spacer to a thickness of about 300 nm, and then rubbed in one direction. The combination of the second base layer, the conductive layer, the spacer, and the vertical alignment film is referred to as a lower laminate.

A liquid crystal composition was coated on the vertical alignment film of the lower laminate to form a liquid crystal layer, and then the pressure-sensitive adhesive layer of the upper laminate was laminated to face the coated surface of the liquid crystal composition to prepare a liquid crystal element film. The liquid crystal composition comprised a liquid crystal compound (Merck, MAT-16-568) and a chiral dopant (HCCH, S811), and the pitch (p) of the liquid crystal layer thus formed was about 20 μm.

Optical Device Manufacturing

Example 1

A first outer substrate, a first intermediate layer, a first polarizer, a second intermediate layer, the prepared liquid crystal element film, a third intermediate layer, a second polarizer, a fourth intermediate layer and a second outer substrate were included sequentially, and intermediate layers were also disposed at all the outer parts to prepare a laminate. Compared to the first outer substrate, the second outer substrate was disposed in the direction of gravity.

The first polarizer and the second polarizer were each a PVA-based polarizer, which were disposed that the light transmission axis of the first polarizer and the light transmission axis of the second polarizer formed about 90 degrees. As the first outer substrate, a glass substrate having a thickness of about 3 mm, an area of width×length=300 mm×300 mm and a curvature radius of about 2,470R was used. As the second outer substrate, a glass substrate having a thickness of about 3 mm, an area of width×length=300 mm×300 mm and a curvature radius of about 2,400R was used.

The second intermediate layer and the third intermediate layer are each a single layer of a TPU layer (Argotec) having a thickness of about 380 μm. The first intermediate layer and the fourth intermediate layer are each a laminate of three TPU layers (Argotec), one layer of which has a thickness of about 380 μm. The TPU layer (Argotec) has a coefficient of thermal expansion of 307 ppm/K and a storage modulus of 8 to 15 MPa. The intermediate layer disposed on the outer part of the liquid crystal element film was also formed of the same material as that of the first to fourth intermediate layers.

An autoclave process was performed on the laminate at a temperature of about 110° C. and a pressure of about 2 atm to manufacture an optical device having the structure of FIG. 6. In the optical device of Example 1, the thicknesses of the second intermediate layer and the third intermediate layer were each about 380 μm, and the total thickness of the intermediate layers was about 3,040 μm.

Example 2

An optical device having the structure of FIG. 7 was manufactured by performing the process in the same manner as in Example 1, except that the first intermediate layer and the fourth intermediate layer were each changed to a single layer of the TPU layer (Argotec) having a thickness of about 380 μm, and the second intermediate layer and the third intermediate layer were each changed to a laminate of three TPU layers (Argotec), one layer of which had a thickness of about 380 μm. In the optical device of Example 2, the total thickness of the intermediate layers was about 3,040 μm.

Example 3

An optical device having the structure of FIG. 8 was manufactured by performing the process in the same manner as in Example 1, except that the first intermediate layer and the fourth intermediate layer were each changed to a single layer of the TPU layer (Argotec) having a thickness of about 380 μm, and the second intermediate layer and the third intermediate layer were each changed to a laminate of two TPU layers (Argotec), one layer of which had a thickness of about 380 μm. In the optical device of Example 3, the total thickness of the intermediate layers was about 2,280 μm.

Comparative Example 1

An optical device having the structure of FIG. 9 was manufactured by performing the process in the same manner as in Example 1, except that the first intermediate layer, the second intermediate layer, the third intermediate layer and the fourth intermediate layer were each changed to a single layer of the TPU layer (Argotec) having a thickness of about 380 μm. In the optical device of Comparative Example 1, the total thickness of the intermediate layers was about 1.520 μm.

Comparative Example 2

An optical device having the structure of FIG. 9 was manufactured by performing the process in the same manner as in Example 1, except that the first intermediate layer and the fourth intermediate layer were each changed to a single layer of the TPU layer (Argotec) having a thickness of about 150 μm, and the second intermediate layer and the third intermediate layer were each changed to a single layer of the TPU layer (Argotec), one layer of which had a thickness of about 380 μm. In the optical device of Comparative Example 2, the total thickness of the intermediate layers was about 1,060 μm.

Evaluation Example 1: Appearance Defect Evaluation Method

In relation to appearance defects, it was measured using an optical microscope (Olympus, BX51-N33 MB) whether appearance defects as shown in FIGS. 3 to 5 were observed in the optical devices manufactured in Examples and Comparative Examples. In the optical devices manufactured according to Examples 1, 2, and 3, appearance defects such as pressing defects, weak crowding defects and strong crowding defects as shown in FIGS. 3 to 5 were not observed. In comparison, the optical devices manufactured according to Comparative Examples 1 and 2 were observed to have appearance defects such as pressing defects, weak crowding defects or strong crowding defects on the liquid crystal element film by the external pressure. Therefore, it can be confirmed that the optical devices manufactured according to Examples 1, 2 and 3 in which the total sum of the thicknesses of the intermediate layers satisfies 1,600 μm or more have excellent appearances even when manufactured by the autoclave process at high temperatures and high pressures, as compared to the optical devices manufactured according to Comparative Examples 1 and 2 in which the total sum of the thicknesses of the intermediate layers does not reach 1,600 μm.

Evaluation Example 2: Light Leakage Observation

FIGS. 10A to 10D are photographs (Olympus, BX51-N33 MB) obtained by photographing the optical devices manufactured in Examples 1 and 2 in a state where no voltage is applied. FIGS. 10A and 10B are images of Examples 1 and 2, respectively, in a state where no voltage is applied, and FIGS. 10C and 10D are images of Examples 1 and 2, respectively, in a state where a voltage of 50V is applied. From FIGS. 10A and 10B, it can be observed that Example 1 has less light leakage in a state where no voltage is applied, as compared to Example 2.

Evaluation Example 3. Electro-Optical Characteristic Evaluation

For the optical devices manufactured in Examples 1 and 2, transmittance in all directions (azimuth angle 0° to) 360° was measured at a deflection angle (polar angle) of 60°, and the results were shown in FIG. 11. The transmittance was measured using a haze meter (CA-2500, manufactured by Konica Minolta) in a state where no voltage was applied to the optical device. The transmittance is average transmittance for light having a wavelength of 380 nm to 780 nm, and it means that the lower the transmittance, the less the light leakage. In FIG. 11, the relative transmittance means relative transmittance when the backlight quantity has been set to 100%. The azimuth angle of 0° is parallel to the rubbing axis of the alignment film of the liquid crystal element film. Examples 1 and 2 each showed the maximum transmittance at an azimuth angle of 110°, where Example 1 had transmittance of 5.51% at an azimuth angle of 110°, and Example 2 had transmittance of 6.03% at an azimuth angle of 110°. In addition, Examples 1 and 2 showed the greatest difference in transmittance at an azimuth angle of 60°, where Example 1 had transmittance of 3.17% at an azimuth angle of 60°, and Example 2 had transmittance of 4.04% at an azimuth angle of 60°.

EXPLANATION OF REFERENCE NUMERALS

10: liquid crystal element film
11a: first base layer
11b: second base layer
12: conductive layer
13: pressure-sensitive adhesive layer
14: spacer
15: alignment film
16: liquid crystal layer
17: sealant
20a: first outer substrate
20b: second outer substrate
30: intermediate layer
40: polarizer (first polarizer, second polarizer)

The invention claimed is:

1. An optical device, comprising:
a first outer substrate;
a second outer substrate;
a liquid crystal element film positioned between the first and second outer substrates;
a first polarizer positioned between the first outer substrate and the liquid crystal element film;
a second polarizer positioned between the second outer substrate and the liquid crystal element film; and
intermediate layers positioned between the first outer substrate and the liquid crystal element film and between the liquid crystal element film and the second outer substrate, respectively,
wherein the intermediate layers comprise intermediate layers which are positioned between the first polarizer and the liquid crystal element film and between the second polarizer and the liquid crystal element film, respectively, and each of the intermediate layers has a thickness of 380 μm or less, and
wherein a sum of the total thicknesses of the intermediate layers is 1,600 μm or more,
wherein the liquid crystal element film comprises:
a first base layer;
a second base layer;
a liquid crystal layer positioned between the first and second base layers;
a patterned spacer to maintain a distance between the first and second base layers;
a first conductive layer positioned on a liquid crystal facing-surface of the first base layer;
a second conductive layer positioned on a liquid crystal facing-surface of the second base layer; and
a pressure-sensitive adhesive layer positioned between the first conductive layer and the liquid crystal layer,
wherein the pressure-sensitive adhesive layer has a storage modulus of 10 MPa or less.

2. The optical device according to claim 1, wherein in the liquid crystal element film, the first and second base layers are each independently a PEN (polyethylene-naphthalate) film, a PI (polyimide) film, a COP (cyclo-olefin polymer) film, TAC (tri-acetyl-cellulose), a PET (polyethyleneterephtalate) film, or a PC (polycarbonate) film.

3. The optical device according to claim 1, wherein the liquid crystal element film further comprises:
an alignment film positioned on the second conductive layer.

4. The optical device according to claim 3, wherein the spacer is formed on the second conductive layer, and wherein the alignment film is positioned both on a surface of the second conductive layer and overlying the spacer.

5. The optical device according to claim 1, wherein the liquid crystal layer comprises a dichroic dye guest.

6. The optical device according to claim 1, wherein the liquid crystal element film is capable of switching between a first orientation state and a second orientation state.

7. The optical device according to claim 1, wherein the first and second outer substrates are glass substrates.

8. The optical device according to claim 1, wherein a total thickness (Ta) of the intermediate layers positioned between the first outer substrate and the liquid crystal element film and a total thickness (Tb) of the intermediate layers positioned between the second outer substrate and the liquid crystal element film are each in a range of 200 to 3,000 μm.

9. The optical device according to claim 1, wherein a thickness ratio (Ta/Tb) of the total thickness (Ta) of the intermediate layers positioned between the first outer substrate and the liquid crystal element film to the total thickness (Tb) of the intermediate layers positioned between the second outer substrate and the liquid crystal element film is in a range of 0.1 to 10.

10. The optical device according to claim 1, wherein the intermediate layers each have a Young's modulus in a range of 0.1 MPa to 100 MPa.

11. The optical device according to claim 1, wherein the intermediate layers each have a coefficient of thermal expansion of 2,000 ppm/K or less.

12. The optical device according to claim 1, wherein the intermediate layers are thermoplastic polyurethane adhesive layers, polyamide adhesive layers, polyester adhesive layers, EVA (ethylene vinyl acetate) adhesive layers, acrylic adhesive layers, silicone adhesive layers, or polyolefin adhesive layers.

13. The optical device according to claim 1, wherein a light transmission axis of the first polarizer and a light transmission axis of the second polarizer are perpendicular to each other.

14. An automobile, comprising:
a vehicle body having an opening formed; and
the optical device of claim 1 mounted in the opening.

* * * * *